United States Patent [19]

Hines

[11] E Re. 30,705

[45] Reissued Aug. 11, 1981

[54] SOIL AERATING DEVICE

[75] Inventor: Charles E. Hines, Lincoln, Nebr.

[73] Assignee: Outboard Marine Corporation, Waukegan, Ill.

[21] Appl. No.: 133,800

[22] Filed: Mar. 25, 1980

Related U.S. Patent Documents

Reissue of:

[64] Patent No.: 4,081,034
Issued: Mar. 28, 1978
Appl. No.: 772,531
Filed: Feb. 28, 1977

[51] Int. Cl.[3] ..... A01B 45/02

[52] U.S. Cl. ..... 172/22; 172/713; 172/771; 30/365

[58] Field of Search ..... 172/19, 21, 22, 713, 172/771; 30/365, 316, 130

[56] References Cited

U.S. PATENT DOCUMENTS

| | | | |
|---|---|---|---|
| 2,063,333 | 12/1936 | Nolte | 172/22 |
| 2,580,236 | 12/1951 | Mascaro | 172/21 X |
| 3,022,833 | 2/1962 | Reaser | 172/22 X |
| 3,171,498 | 3/1965 | Logan | 172/22 |
| 3,221,822 | 12/1965 | Dedoes | 172/22 |
| 3,264,877 | 8/1966 | Boxrud | 172/22 X |
| 3,650,332 | 3/1972 | Dedoes | 172/22 |
| 3,739,857 | 6/1973 | Little | 172/22 |
| 3,794,121 | 2/1974 | Drozak | 172/21 |
| 3,881,553 | 5/1975 | Angeski | 172/22 |

FOREIGN PATENT DOCUMENTS

| | | | |
|---|---|---|---|
| 609503 | 2/1935 | Fed. Rep. of Germany | 172/22 |

*Primary Examiner*—Paul E. Shapiro

[57] ABSTRACT

Disclosed herein is a soil aerating device including a frame, a hollow cylindrical drum supported from the frame for rotation about a horizontally extending axis and for folling travel along the surface of the ground or turf to be aerated. Fixedly mounted on the exterior of the drum in registry with respective apertures provided in the drum are a plurality of hollow core-forming tines which are arranged to act much like involute gear teeth, while cutting and removing a plug or core from the ground or turf as the drum is rolled over the surface thereof, and to leave a "rack-like" pattern of holes. Each tine includes a pair of generally V-shaped, opposed side walls having an apex located on or near a radial plane extending radially from the drum axis. At least a part of the leading end portions of the side walls terminates in a sharpened cutting edge segment and the trailing end portions of the side walls are connected by a transverse trailing end wall which cooperates with the side wall cutting edge segments to form a generally U-shaped cutting edge.

33 Claims, 9 Drawing Figures

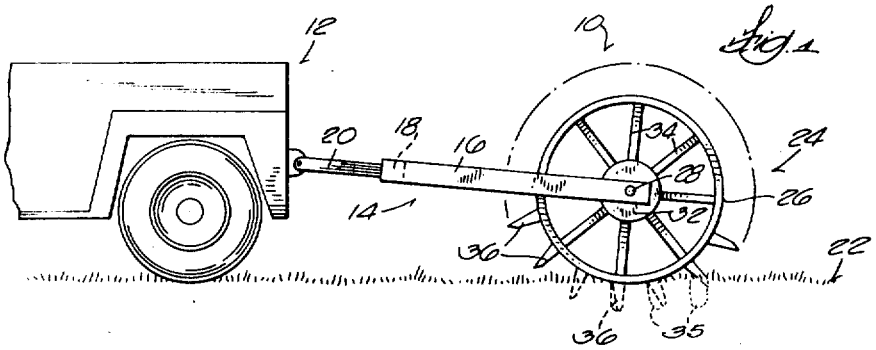
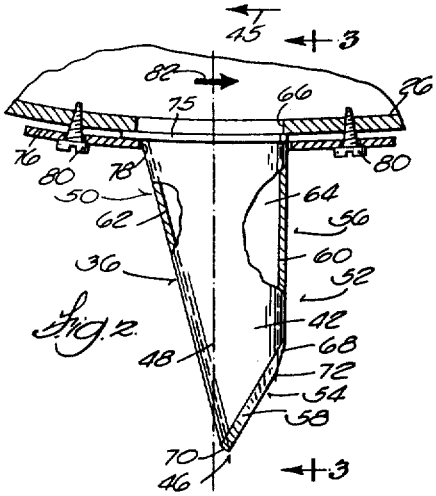
Fig. 2.
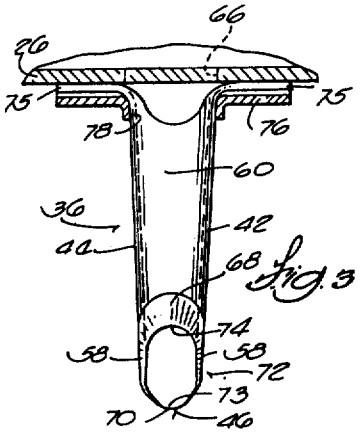
Fig. 3
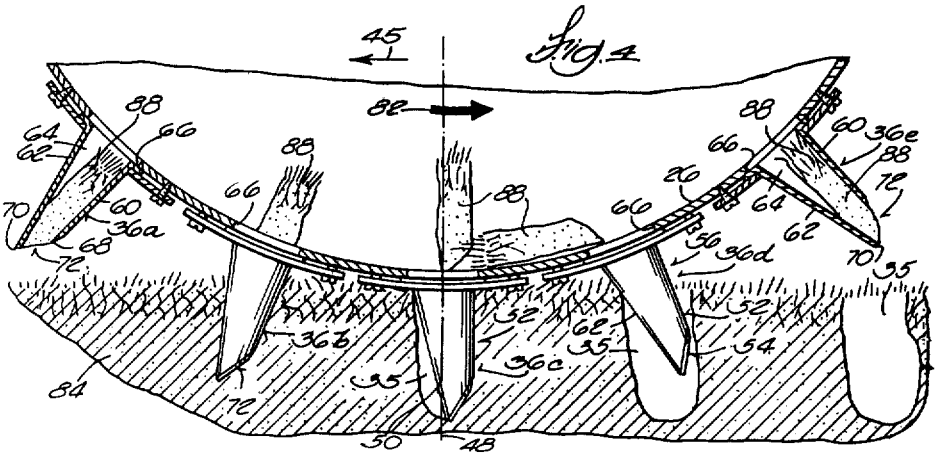
Fig. 4

SOIL AERATING DEVICE

Matter enclosed in heavy brackets [ ] appears in the original patent but forms no part of this reissue specification; matter printed in italics indicates the additions made by reissue.

BACKGROUND OF THE INVENTION

The invention relates to soil aerating devices and, more particularly, to soil aerating devices including a cylindrical drum carrying a plurality of core-forming elements or tines.

Soil aerating devices including one or more wheels or cylindrical drums carrying a plurality of tubular, cylindrical soil core-forming elements or tines which are either pivotally or fixedly attached on the periphery of the drum and penetrate the ground to remove plugs or cores of soil and/or grass as the drum is rolled over a turf surface are used for aerating golf course greens, fairways and tees, playing fields, lawns, etc. In order to minimize puckering of the soil and/or tearing of the grass adjacent the holes formed by the tines, such devices usually must be operated at relatively low speeds.

Examples of prior art constructions for soil aerating devices of this general type are disclosed in the following United States patents:

Mascaro; U.S. Pat. No. 2,580,236 issued Dec. 25, 1951
Reasor; U.S. Pat. No. 3,022,833 issued Feb. 27, 1962
Dedoes; U.S. Pat. No. 3,650,332 issued Mar. 21, 1972
Drozak; U.S. Pat. No. 3,794,121 issued Feb. 26, 1974

Attention is also directed to the Boxrud U.S. Pat. No. 3,264,877 issued Aug. 9, 1966 which discloses a soil sampling device employing hollow cylindrical soil probes.

SUMMARY OF THE INVENTION

The invention provides a soil aerating device including a hollow cylindrical drum rotatably supported for rolling travel over the surface of the ground or turf to be aerated. A plurality of circumferentially spaced, hollow core-forming tines which are fixedly mounted on the exterior of the drum and are arranged to act much like involute gear teeth, while cutting and removing plugs or core of soil and/or grass from the ground or turf as the drum is rolled over the surface thereof, and to leave a "rack-like" pattern of holes in the ground or turf.

More specifically, each of the tines includes a pair of generally V-shaped, opposed side walls which extend radially outwardly from the drum and have an apex located on or near a radial plane extending radially from the drum axis. Each of the tine side walls has a trailing end portion and a leading end portion having, adjacent the apex, a first part which terminates in a cutting edge segment. The trailing end portions of the tine side walls are connected by a transverse trailing end wall which cooperates with the side walls to define a hollow interior communicating with an aperture provided in the drum for each tine and terminates in a cutting edge segment which cooperates with the side wall cutting edge segments to form a generally U-shaped cutting edge having a bight located adjacent the side wall apexes.

Means preferably are provided for removably mounting the tines on the exterior of the drum.

In one embodiment, the side walls extend generally parallel to the direction of travel.

In one embodiment, the leading end portions of each of the tine side walls includes a second part extending from the side wall cutting edge segment toward the drum and the second parts are connected by a transverse leading end wall which terminates in a cutting edge segment and joins the U-shaped cutting edge to form a generally oblong cutting edge having one bight located adjacent the side wall apexes and the other bight located rearwardly from the side wall apexes in the direction of travel.

In another embodiment, the trailing end wall extends in a substantially straight line from the side wall apexes toward the drum in the direction of travel at an acute angle to the radial plane and the side wall cutting edge segments extend in a substantially straight line from the side wall apexes toward the drum in the direction opposite to the direction of travel at an acute angle to the radial plane. In this embodiment, the leading end wall connecting the parts of the trailing end portion of the side walls other than the cutting edge segments thereof can extend in a substantially straight line from the side wall cutting edge segments toward the drum at an obtuse angle to the side wall cutting edge segments.

In still another embodiment, the apexes of the tine side walls are located on the radial plane, the leading and trailing end portions of the side walls are symmetrical and extend from the apexes toward the drum in an involute curve, and a thatch cutter element including a transverse end wall terminating in a cutting edge located rearwardly of the trailing end portions of the side walls is provided for cutting through thatch and for forming the rear end portion of the hole formed in the turf by the tine when the tine is substantially vertical.

A principal feature of the invention is the provision of a soil aerating device including a plurality of core-forming tines which are arranged to permit the device to be moved over the surface of the ground or turf at relatively high speeds with minimum puckering of the soil and/or tearing of the grass adjacent the core holes formed in the ground or turf by the tine.

Another principal feature of the invention is the provision of a soil or turf aerating device including a hollow cylindrical drum rotatably mounted for travel over the surface of the ground or turf to be aerated and a plurality of core-forming tines which are fixedly mounted on the exterior of the drum and are arranged to act much like involute gear teeth, while cutting and removing a core plug from the ground or turf as the drum is rolled over the surface thereof, and to leave a "rack-like" pattern of holes.

Other features and advantages of the embodiments of the invention will become apparent to those skilled in the art upon reviewing the following detailed description, the drawings and the appended claims.

BRIEF DESCRIPTION OF THE DRAWINGS

FIG. 1 is a side elevation view of a soil or turf aerating device which embodies various of the features of the invention and which is shown hitched to the rear of a vehicle for towing over the surface of a turf to be aerated.

FIG. 2 is an enlarged, fragmentary view, partially sectioned, of a core-forming tine of the aerating device shown in FIG. 1.

FIG. 3 is a view taken generally along line 3—3 in FIG. 2.

FIG. 4 is an enlarged, fragmentary view, partially sectioned, of the core-forming assembly of the aerating device shown in FIG. 1, illustrating the manner in which the core-forming tines form and remove cores from a turf.

Figure 5:
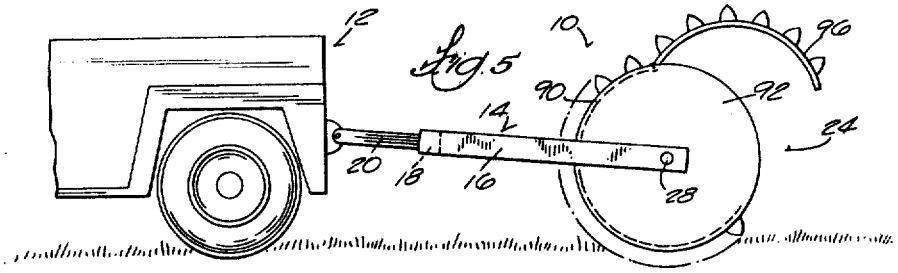
FIG. 5 is a side elevation view of an alternate construction of the aerating device.

Before explaining at least one embodiment of the invention in detail, it is to be understood that the invention is not limited in its application to the details of construction and the arrangements of the components set forth in the following description or illustrated in the drawing. The invention is capable of other embodiments and of being practiced and carried out in various ways. Also, it is to be understood that the phraseology and terminology employed herein is for the purposes of description and should not be regarded as limiting.

DESCRIPTION OF THE PREFERRED EMBODIMENTS

Illustrated in the drawings is a soil aerating device 10 embodying various of the features of the invention and adapted for connection to a towing vehicle 12 (shown fragmentarily in FIGS. 1 and 5) such as a utility cart of the type commonly used around golf courses and the like. The soil aerating device 10 includes a relatively heavy frame 14 having a pair of generally longitudinally disposed, laterally spaced side arms 16 (one shown) connected at the forward ends by a cross member or draw bar 18 and one or more draw arms 20 extending forwardly from the draw bar and adapted to be hitched to the rear of the utility cart 12.

Rotatably mounted on the rear ends of the side arms 16 for removing plugs or cores of grass and soil from a turf 22 (e.g., a golf course fairway, tee or green), as the device 10 is towed along the surface thereof, is a core-forming assembly 24 including a ground-engageable, hollow, cylindrical drum 26 which is carried on a shaft or axle 28 suitably journaled at the opposite ends in the side arms 16 and which acts as a wheel when the device 10 is being towed by the utility cart 12. The opposite ends of the drum 16 are supported on the axle 28 by a central hub 32 through which the axle 28 extends and a plurality of circumferentially spaced, radially extending spokes 34 connected between the hub 32 and the drum 26. The utility cart 12 usually is provided with a conventional power lift mechanism (not shown) which is suitably connected to the frame 14 for selectively raising and lowering the drum 26 from and into ground engagement.

Fixedly mounted on the exterior of the drum 26 and extending radially therefrom is a plurality of hollow coring elements or tines 36. The tines 36 are arranged so that, as the drum 26 is rolled over the surface of the turf 22, the drum 26 and the tines 36 act much like a pinion gear with the tines 36 cutting through the grass and thatch, penetrating the subsoil, removing a plug or core of grass and soil, and leaving parallel rows of holes 35 (FIG. 4) in the turf 22 having a "rack-like" pattern. In other words, the tines 36 are arranged relative to the outer diameter of the drum 26 in general accordance with the geometry for involute gear teeth of a gear having a minor diameter corresponding to the outer diameter of the drum 26. The tines 36 preferably are arranged in a plurality of laterally spaced, parallel rows with the tines in each row circumferentially spaced at equal intervals, the tines in one row being staggered with respect to tines in the adjacent rows, and the tines in alternate rows being generally laterally aligned in parallel relationship to the rotational axis of the drum 26.

While various tine shapes capable of providing the desired cutting action can be used, in the specific construction illustrated in FIGS. 1–4, each of the tines 36 has a main body including a pair of generally V-shaped, opposed side walls 42 and 44 which extend radially outwardly from the outer periphery of the drum 26 generally parallel to the direction of travel, represented by the arrow 45, and have an apex 46 located near a plane extending radially from the axis of rotation of the drum 26 (i.e., the radial plane designated by reference numeral 48 in FIG. 2). In the specific construction illustrated in FIGS. 1–4, the side wall apexes 46 are located slightly rearwardly from the radial plane 48 in the direction of travel. The apexes 46 of the side walls 42 and 44 extend radially outwardly from the outer periphery of the drum 26 at a distance substantially corresponding to the depth of tine penetration and, thus, the length of the core to be cut. As best shown in FIG. 3, thus, the side walls 42 and 44 converge slightly in a radially outwardly direction to provide a draft for facilitating extraction of a core as explained below.

Each of the side walls 42 and 44 (FIG. 2) has a trailing end portion 50 extending in a substantially straight line from the apex 46 toward the drum 26 at an acute angle to the direction of travel and a leading end portion 52 including a first or outer part 54 which extends in a substantially straight line from the apex 46 toward the drum 26 at an acute angle to the direction of travel (in the opposite sense) and a second or inner part 56 which joins the outer part 54 and extends in a substantially straight line toward the drum 26 at an obtuse angle to the outer part 54, e.g., generally parallel to the radial plane 48 as shown. The outer parts 54 of the side wall leading end portions 52 are open and terminate in a sharpened cutting segment 58. The inner parts 56 of the side wall leading end portions 52 are connected by a transverse, arcuate first or leading end wall 60 and the side wall trailing end portions 50 are connected by a second transverse, arcuate second or trailing end wall 62. The leading and trailing end walls 60 and 62 cooperate with the side walls 40 and 44 to define a hollow interior 64 which has a generally elliptical or oblong cross section and communicates with the interior of the drum 26 through a slotted or oblong aperture 66 provided in the drum 26 for each of the tines 36.

The leading end wall 60 terminates in a sharpened cutting edge segment 68 and the trailing end wall 62 terminates in a sharpened cutting edge segment 70. The cutting edge segments 68 and 70 cooperate with the side wall cutting edge segments 58 to form a generally elliptical or oblong cutting edge 72 having a forward bight 73 located adjacent the side wall apexes 46 and a rearward bight 74 located rearwardly from the side wall apexes 46 in the direction of travel.

As the drum 26 rolls over the turf 22 during a core-forming operation explained in more detail below, the generally U-shaped portion of the cutting edge 72 formed by the cutting edge segment 68 and the adjacent portions of the side wall cutting edge segments 58 usually cuts through the turf first and forms the forward end portion of the resulting hole 35. The generally U-shaped portion of the cutting edge 72 formed by the cutting segment 78 and the adjacent portions of the side wall cutting edge segments 58 usually cuts through the turf last and forms the rear end portion of the hole 35.

Means are provided for removably mounting each of the tines 36 on the outer surface of the drum 26 in registry with a respective one of the drum apertures 66. While various arrangements can be used, in the specific construction illustrated in FIGS. 1–4, such means includes providing each of the side walls 42 and 44 with a laterally outwardly extending flange 75 which has a radius on the underside conforming to the outer surface of the drum 26 and abuts the outer surface of the drum 26. Each of the tines 36 is held in place by an elongated, arcuate retainer plate 76 which has a central aperture 78 through which the main body of the tine 36 extends, which abuttingly overlies the tine flanges 75, and which has a radius on the underside generally conforming to the outer radius of the drum 26. The plate 76 is removably fastened on the drum 26 such as by tap screws 80 to clamp the tine 36 in place on the drum 26.

During rolling movement of the drum 26 along the surface of the turf 22, the weight of the drum 26 and the frame 14, optionally assisted by a weight ballast (not shown) carried on the frame 14 and/or by a downward force imposed on the frame 14 by the vehicle power lift mechanism, causes the tines 36 to penetrate through the turf 22 and remove a plug or core of grass and soil therefrom.

FIG. 4 illustrates a manner in which one circumferentially extending row of the tines 36a, 36b, 36c, 36d, and 36e cut and remove a plug or core. As the core-forming assembly 24 is moved in a forward direction, i.e., in the direction of the arrow 45, the drum 26 rotates in a counterclockwise direction as illustrated by the arrow 82. The tine 36a is shown in the position prior to the time the cutting edge 72 thereof has been rotated downwardly into engagement with the surface of the turf 22. As a tine is rotated with the drum 26 during continued forward movement, the cutting edge 72 cuts through the grass and the underlying thatch as illustrated by the tine 36b. The pointed end provided by the side wall apexes 36 and the trailing cutting edge segments 70 assures that the tine effectively penetrates the turf surface and directs the tine downwardly into the subsoil 84. Each of the tines progressively penetrate the surface of the turf 22 and moves downwardly into the subsoil 84 until the tine is substantially vertical to the point of entry as illustrated by the tine 36c. At this time, the tine 36c is at full penetration and the portions of the side walls 42 and 44, the leading end portion 52 and the trailing end portion 50 adjacent the drum 26 generally define the size and shape of the mouth of the hole 35 formed in the turf 22 by the tine.

Immediately following full penetration, continued rotation of the drum 26 causes the tine to begin to withdraw from the hole 35 as illustrated by the tine 36d. The radial dimension of the side walls 42 and 44 relative to the drum radius, the angles of the inner and outer parts 56 and 54 of the leading end portion 52 and the angle of the trailing end wall 62 permit the tine to be withdrawn with a minimum disturbance to the grass and/or soil adjacent the mouth of the hole 35 as illustrated by the tines 36d and 36e.

As illustrated by the tine 36e, a plug or core 88 of grass and soil is removed from the turf 22 and carried upwardly with the tine. The core 88 is held inside the tine by engagement with the hollow interior 64 adjacent the cutting edge 72. The cross section of the core 88 has an oblong shape generally conforming to the opening defined by the cutting edge 72 and is somewhat smaller than the tine interior 64 because of the above-described draft of the side walls 42 and 44.

The core 88 usually remains inside the tine as the drum 26 moves through a rotational cycle as illustrated by tines 36e and 36a. When the drum 26 has completed its cycle and the tine penetrates the turf 22 to cut a second core, the second core pushes the first core 88 from the tine interior 64, through the drum aperture 66, and into the interior of the drum 26 as illustrated by the tines 36b and 36c. As the drum continues to rotate, the cores 88 accummulating in the interior of the drum 26 eventually are discharged onto the ground through one of the open opposite ends of the drum 26. The above-described cutting and core removal action provided by the tines 36 produces a clean cut in the turf around the periphery of the core and permits the soil aerating device 10 to be towed at speeds up to 15 miles per hour or more with a minimum puckering of the soil and tearing of the grass adjacent the mouth of the holes 35 formed in the turf.

In the alternate construction illustrated in FIG. 5, the drum 90 is arranged to collect the cores 88. Instead of the open spoke arrangement described above, each of the opposite ends of the drum 90 is closed by a circular disc-like member 92 including a central hub for receiving the axle 28 and the drum 90 includes a hinged portion 96 which is arranged to serve as a door which can be opened for dumping accummulated cores from the interior of the drum.

FIGS. 6 and 7 and FIGS. 8 and 9 illustrate alternate constructions for the tines, which constructions provide substantially the same core cutting and removal action as described above. In the construction illustrated in FIGS. 6 and 7, the tine 98 includes a pair of opposed, generally V-shaped side walls 100 and 102 having a shape quite similar to the side walls 42 and 44 in the construction illustrated in FIGS. 1–4, except the side wall apexes 104 are located slightly forwardly of the radial plane 48 in the direction of travel, the inner parts 106 of the leading end portions 107 are considerably shorter and extend in a substantially straight line from the side wall cutting edge segments 108 toward the drum 26 substantially parallel to the trailing end portion 110 as shown.

Figure 6:
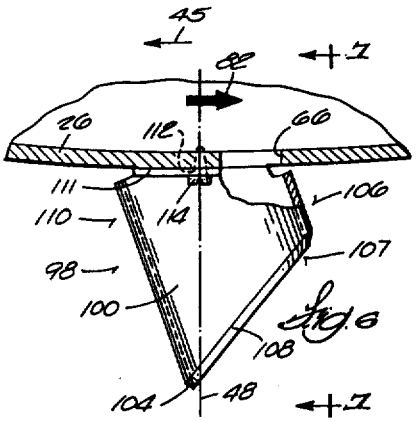
FIG. 6 is a view similar to FIG. 2 illustrating an alternate construction for the core-forming tines.
Figure 7:
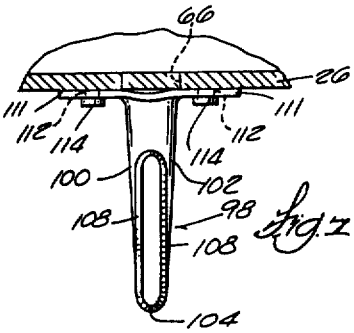
FIG. 7 is a view taken generally along line 7—7 in FIG. 6.

In the specific construction illustrated in FIGS. 6 and 7 the mounting means for the tines 98 include providing each of the side walls 100 and 102 with a laterally outwardly extending flange 111 which has a radius on the underside conforming to the radius of the drum 26 and an aperture 112 for receiving a suitable removable fastening means, such as a tap screw 114 or the like, for removably fastening the tine 98 on the outer surface of the drum 26.

Figure 8:
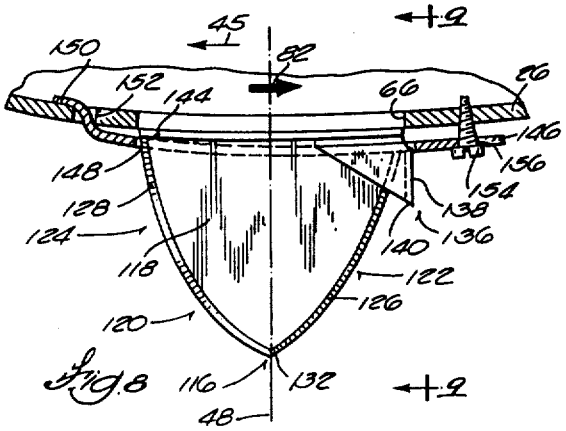
FIG. 8 is a view similar to FIG. 2 illustrating another alternate construction of the core-forming tines.
Figure 9:
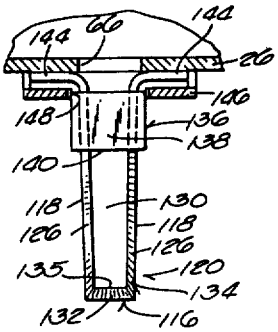
FIG. 9 is a view taken generally along line 9—9 in FIG. 8.

In the alternate construction illustrated in FIGS. 8 and 9, the apexes 116 of the side walls 118 of the tine 120 are located on the radial plane 48 and the leading and trailing end portions 122 and 124 of each side wall 118 extend from the apex 116 toward the drum 26 in an involute curve. As in the tine construction described above, the side walls 118 extend radially outwardly from the drum 26 generally parallel to the direction of travel and converge slightly in a radially outwardly direction to provide a draft to facilitate core extraction. The leading end portion 122 of each side wall 118 is open substantially along its entire dimension from the apex 116 to the drum 26 and terminates in a sharpened cutting edge segment 126.

The trailing end portions 124 of the side walls 118 are connected by a transverse arcuate wall 128 which cooperates with the side walls 118 to define a hollow interior 130 communicating with a respective drum aperture 66. The radially outermost portion of the trailing end wall 128 terminates adjacent the side wall apexes 116 in a sharpened cutting edge segment 132 which cooperates with the side wall cutting edge segments 126 to form a generally U-shaped cutting edge 134 having a bight 135 located adjacent the side wall apexes 116.

Located generally rearwardly, in the direction of travel, from the leading end portion 122 of the side walls 118 adjacent the drum 26 is a thatch cutter element 136 including a transverse wall 138 which extends from adjacent the drum 26 generally parallel to the radial plane 48 and terminates in a sharpened cutting edge 140. The thatch cutter element 136 is dimensioned relative to the outer surface of the drum 26 so that, as the tine 120 is rotated to a substantially vertical position (i.e., like the position of the tine 36c in FIG. 4), the cutting edge 140 of the thatch cutter element 136 cuts completely through the grass and the underlying thatch. Thus, the cutting edge 140 of the thatch cutter element 136 forms the rear end portion of the hole cut in the turf 22 by the tine 120 and makes a clean cut through the thatch so as to minimize tearing of the turf adjacent the rear end portion of the hole as the tine 120 is withdrawn therefrom in the manner described above.

In the specific construction illustrated in FIGS. 8 and 9, the mounting means for the tines includes providing each of the tine side walls 118 with a laterally outwardly extending flange 144 (similar to the flange 75 in the construction illustrated in FIGS. 2 and 3) and an elongated, arcuate retainer plate 146 (similar to the retainer plate 76 in the construction illustrated in FIGS. 2 and 3) which includes a generally central aperture 148 for receiving the main body of the tine 120 and which is arranged to abuttingly overlie the flanges 144. The retainer plate 146 is removably secured to the drum by slipping a tab 150 provided on one end of the retainer plate 146 into a slot 152 in the drum 26 and fastening the other end of the retainer plate 146 on the drum 26 with a suitable removable fastening means such as a tap screw 154 which extends through an aperture 156 in the end of the retainer plate 146 opposite to the tab 150 and is threaded into the drum 26. With this mounting arrangement, a single fastening means can be used for holding a tine on the drum, thereby reducing the time required for initial assembly and to replace tines for maintenance. It should be understood that any one of the above-described tine constructions can be arranged to employ any of the above-described mounting arrangements.

From the standpoint of disturbance to the turf, the construction illustrated in FIGS. 8 and 9 generally causes less disturbance because of the true involute shape of the side walls 118. However, the constructions illustrated in FIGS. 1-4 and FIGS. 6 and 7 are less expensive to manufacture because of their simpler arrangement and, due to the plastic consistency of soils, produce substantially the same core cutting and removal action as a tine having an involute shape.

While the invention has been described in connection with a soil aerating device which is towed behind a vehicle of some sort, it should be understood that it can be adapted for use with many other types of aerators including walk-behind, self-propelled units.

Many advantages of the invention can be obtained by arranging the side walls, the leading end wall, and the trailing end wall of the tine so that they form a generally conical shape and define a hollow interior having a generally circular cross section instead of the side walls extending generally parallel to the direction of travel to form a hollow interior having a generally elliptical or oblong cross section.

Various of the features of the invention are set forth in the following claims:

What is claimed is:

1. A soil aerating device comprising a hollow cylindrical drum supported for rotation about a horizontally extending axis and for rolling travel along the surface of the ground or turf to be aerated, said drum having an outer wall including a plurality of circumferentially spaced apertures, and a plurality of core-forming tines fixedly mounted on the exterior of said drum and extending radially outwardly therefrom, each of said tines including a pair of generally V-shaped opposed side walls extending generally parallel to the direction of travel and having an apex located on or near a radial plane extending radially from the drum axis, each of said side walls having a trailing end portion and a leading end portion having, adjacent said apex, a first part which terminates in a cutting edge segment, and a transverse trailing end wall connecting said trailing end portions of said side walls and cooperating with said side walls to define a hollow interior communicating with a respective one of said drum apertures, said trailing end wall having a radially outermost end portion terminating in a cutting edge segment which cooperates with said side wall cutting edge segments to form a generally U-shaped cutting edge having a bight located adjacent said side wall apexes.

2. A soil aerating device according to claim 1 including means for removably mounting each of said tines on the exterior surface of said drum outer wall.

3. A soil aerating device according to claim 2 wherein each of said side walls have an inner end portion located adjacent said drum, and wherein said mounting means includes a flange extending laterally outwardly from said inner end portion of each of said side walls and adapted to abut the exterior surface of said drum outer wall, an elongate retainer plate abuttingly overlying said side wall flanges and having opposite end portions extending circumferentially beyond said side wall flanges, and means for removably mounting each of the opposite ends of said retainer plate on said drum and thereby clamping said tine in place on said drum.

4. A soil aerating device according to claim 3 wherein said fastening means includes a tab on one end of said retainer plate, a slot in said drum for receiving said retainer plate tab, and an aperture in the opposite end of said retainer plate for receiving a fastener extending into said drum outer wall.

5. A soil aerating device according to claim 2 wherein each of said side walls has an inner end portion adjacent said drum, and wherein said mounting means comprises a flange extending laterally outwardly from said inner end portion of each of said side walls and adapted to abut the exterior of said drum outer wall, and an aperture in each of said flanges for receiving a fastener removably mounted in said drum outer wall.

6. A soil aerating device according to claim 1 wherein said leading end portion of each of said side walls includes a second part extending from said side wall cutting edge segment toward said drum, and wherein each of said tines further includes a transverse leading end wall connecting said second parts of said side wall leading end portions, said leading end wall having a radially outermost end portion terminating in a cutting edge segment joining said U-shaped cutting edge to form a generally oblong cutting edge having one bight located adjacent said side wall apexes and the other bight located rearwardly from said side wall apexes in the direction of travel.

7. A soil aerating device according to claim 6 wherein said trailing end wall extends in a substantially straight line from said side wall apexes toward said drum in the direction of travel at an acute angle to said radial plane, and wherein said side wall cutting edge segments extend in a substantially straight line from said side wall apexes toward said drum in a direction opposite to the direction of travel at an acute angle to said radial plane.

8. A soil aerating device according to claim 7 wherein said side wall apexes are located rearwardly from said radial plane in the direction of travel.

9. A soil aerating device according to claim 8 wherein said leading end wall extends in a substantially straight line from said side wall cutting edge segments toward said drum at an acute angle to said side wall cutting edge segments.

10. A soil aerating device according to claim 9 wherein said leading end wall extends substantially parallel to said trailing end wall.

11. A soil aerating device according to claim 7 wherein said side wall apexes are located forwardly of said radial plane.

12. A soil aerating device according to claim 11 wherein said leading end wall extends in a substantially straight line from said side wall cutting edge segments toward said drum at an obtuse angle to said side wall cutting edge segments.

13. A soil aerating device according to claim 12 wherein said leading end wall extends substantially parallel to said radial plane.

14. A soil aerating device according to claim 1 wherein said side wall apexes are located on said radial plane, and wherein said trailing and leading end portions of said side walls are symmetrical and extend from said side wall apexes toward said drum in an involute curve.

15. A soil aerating device according to claim 14 wherein said side wall cutting edge segments extend substantially entirely along said side wall trailing end portions, and wherein each of said tines includes a thatch cutter element located adjacent said drum and having a transverse wall which is located rearwardly from said side wall leading end portions in the direction of travel and extends from said drum substantially parallel to said radial plane, said thatch cutter element wall having a radially outermost end portion terminating in a cutting edge for cutting through thatch when said tine is substantially vertical.

16. A soil aerating device comprising a hollow cylindrical drum supported for rotation about a horizontally extending axis and for rolling travel along the surface of the ground or turf to be aerated, said drum having an outer wall including a plurality of circumferentially spaced apertures, and a plurality of core-forming tines fixedly mounted on the exterior of said drum and extending radially outwardly therefrom, each of said tines including a pair of generally V-shaped, opposed side walls having an apex located on or near a radial plane extending radially from the drum axis, each of said side walls having a trailing end portion and a leading end portion having, adjacent said apex, a first part which terminates in a cutting edge segment, and a transverse trailing end wall connecting said trailing end portions of said side walls and cooperating with said side walls to define a hollow interior communicating with a respective one of said drum apertures, said trailing end wall having a radially outermost end portion terminating in a cutting edge segment which cooperates with said side wall cutting edge segments to form a generally U-shaped cutting edge having a bight located adjacent said side wall apexes.

*17. A core-forming tine for a soil aerating device including a hollow cylindrical drum supported for rotation about a horizontally extending axis and for rolling travel along the surface of the ground or turf to be aerated and an outer wall including at least one aperture, said tine being adapted to be fixedly mounted on the exterior of the drum and to extend radially outwardly therefrom, said tine including a pair of generally V-shaped opposed and parallel side walls, each of said side walls having an apex, a trailing end portion, and a leading end portion having, adjacent said apex, a first part which terminates in a cutting edge segment, and a transverse trailing end wall connecting said trailing end portions of said side walls and cooperating with said side walls to define a hollow interior adapted to communicate with the drum aperture when said tine is mounted in the drum, said trailing end wall having a radially outermost end portion terminating in a cutting end segment which cooperates with said side wall cutting edge segments to form a generally U-shaped cutting edge having a bight located adjacent said side wall apexes.*

*18. A core-forming tine according to claim 17 including means for removably mounting said tine on the exterior surface of the drum outer wall.*

*19. A core-forming tine for a soil aerating device according to claim 18 wherein each of said side walls has an inner end portion located adjacent the drum when said tine is mounted on the drum, and wherein said mounting means includes a flange extending laterally outwardly from said inner end portion of each of said side walls and adapted to abut the exterior surface of the drum outer wall, an elongate retainer plate abuttingly overlying said side wall flanges and having opposite end portions adapted to extend circumferentially beyond said side wall flanges, and means for removably mounting each of the opposite ends of said retainer plate on the drum to thereby clamp said tine in place on the drum.*

*20. A core-forming tine for a soil aerating device according to claim 19 wherein said means for removably mounting said retainer plate includes a tab on one end of said retainer plate for extending into a slot in the drum, and an aperture in the opposite end of said retainer plate for receiving a fastener extending through said drum outer wall.*

*21. A core-forming tine for a soil aerating device according to claim 18 wherein each of said side walls has an inner end portion adjacent said drum when said tine is mounted on the drum, and wherein said mounting means comprises a flange extending laterally outwardly from said inner end portion of each of said side walls and adapted to abut the exterior of the drum outer wall, and an aperture in each of*

*said flanges for receiving a fastener adapted to be removably mounted to the drum outer wall.*

*22. A core-forming tine for a soil aerating device according to claim 17 wherein said leading end portion of each of said side walls includes a second part extending from said side wall cutting edge segment toward the drum when said tine is mounted on the drum, and wherein said tine further includes a transverse leading end wall connecting said second parts of said side wall leading end portions, said leading end wall having a radially outermost end portion terminating in a cutting edge segment joining said U-shaped cutting edge to form a generally oblong cutting edge having one bight located adjacent said side wall apexes and the other bight located rearwardly from said side wall apexes in the direction of intended drum travel.*

*23. A core-forming tine for a soil aerating device according to claim 22 wherein said trailing end wall extends in a substantially straight line from said side wall apexes and, when said tine is mounted on the drum, toward the drum in the direction of travel at an acute angle to said radial plane, and wherein said side wall cutting edge segments extend in a substantially straight line from said side wall apexes toward the drum in a direction opposite to the direction of travel at an acute angle to said radial plane.*

*24. A core-forming tine for a soil aerating device according to claim 23 wherein said side wall apexes are located rearwardly from said radial plane in the direction of travel.*

*25. A core-forming tine for a soil aerating device according to claim 24 wherein said leading end wall extends in a substantially straight line from said side wall cutting edge segments toward said drum at an acute angle to said side wall cutting edge segments.*

*26. A soil core-forming tine for a soil aerating device according to claim 25 wherein said leading end wall extends substantially parallel to said trailing end wall.*

*27. A soil core-forming tine for a soil aerating device according to claim 23 wherein said side wall apexes are located forwardly of said radial plane.*

*28. A soil core-forming tine for a soil aerating device according to claim 27 wherein said leading end wall extends in a substantially straight line from said side wall cutting edge segments and, when said tine is mounted on the drum, toward the drum at an obtuse angle to said side wall cutting edge segments.*

*29. A soil core-forming tine for a soil aerating device according to claim 28 wherein said leading end wall extends substantially parallel to said radial plane.*

*30. A soil core-forming tine for a soil aerating device according to claim 17 wherein said side wall apexes are located on said radial plane, and wherein said trailing and leading end portions of said side walls are symmetrical and extend from said side wall apexes and, when said tine is mounted on the drum, toward said drum in an involute curve.*

*31. A soil core-forming tine for a soil aerating device according to claim 30 wherein said side wall cutting edge segments extend substantially entirely along said side wall trailing end portions, and wherein said tine includes a thatch cutter element located, when said tine is mounted the drum, adjacent the drum and having a transverse wall which is located rearwardly from said side wall leading end portions in the direction of intended travel and extends from said drum substantially parallel to said radial plane, said thatch cutter element wall having a radially outermost end portion terminating in a cutting edge for cutting through thatch when said tine is substantially vertical.*

*32. A core-forming tine for a soil aerating device including a hollow cylindrical drum supported for rotation about a horizontally extending axis and for rolling travel along the surface of the ground or turf to be aerated, and an outer wall including an aperture, said tine being adapted to be fixedly mounted on the exterior of the drum and to extend radially outwardly therefrom, said tine including a pair of generally V-shaped, opposed side walls each having an apex, each of said side walls having a trailing end portion and a leading end portion having, adjacent said apex, a part which terminates in a cutting edge segment, and a transverse trailing end wall connecting said trailing end portions of said side walls and cooperating with said side walls to define a hollow interior adapted to communicate, when said tine is mounted on the drum, with the drum aperture, said trailing end wall having a outermost end portion terminating in a cutting edge segment which cooperates with said side wall cutting edge segments to form a generally U-shaped cutting edge having a bight located adjacent said side wall apexes.*

*33. A core-forming tine for a soil aerating device including a hollow cylindrical drum supported for rotation about a horizontally extending axis and for rolling travel along the surface of the ground or turf to be aerated, and an outer wall including an aperture, said tine being adapted to be fixedly mounted on the exterior of the drum and to extend radially outwardly therefrom, said tine including a pair of generally V-shaped, opposed side walls each having a trailing end portion and a leading end portion including an outer part which terminates in a cutting edge segment, said tine also including a transverse trailing end wall connecting said trailing end portions of said side walls and cooperating with said side walls to define a hollow interior communicating, when said tine is mounted on the drum, with the drum aperture, said trailing end wall having an outermost cutting edge segment which cooperates with said side wall cutting edge segments to form a generally U-shaped cutting edge.*

* * * * *